United States Patent [19]

Weiss et al.

[11] Patent Number: 5,667,047
[45] Date of Patent: Sep. 16, 1997

[54] TRANSMISSION OF AN INTERNAL COMBUSTION ENGINE WITH A CLUTCH WITH A TWO-MASS FLYWHEEL

[75] Inventors: Michael Weiss, Dittelbrunn; Jörg Sudau, Niederwerrn; Bernhard Schierling, Kurnach; Thomas Wirth, Schwanfeld; Jürgen Kleifges, Schweinfurt; Reinhard Feldhaus, Ebenhausen; Andreas Orlamünder, Schweinfurt; Eberhard Knaupp, Warneck, all of Germany

[73] Assignee: Fichtel & Sachs AG, Schweinfurt, Germany

[21] Appl. No.: 502,401

[22] Filed: Jul. 14, 1995

[30] Foreign Application Priority Data

Jul. 15, 1994 [DE] Germany .................. 44 25 065.7
May 26, 1995 [DE] Germany .................. 195 19 363.6

[51] Int. Cl.⁶ ............................ F16F 15/12; F16D 13/60
[52] U.S. Cl. .................... 192/55.61; 74/574; 192/201; 192/214.1
[58] Field of Search ............... 192/55.61, 70.17, 192/111 A, 201, 213.3, 213.31, 214, 214.1, 70.25; 74/574

[56] References Cited

U.S. PATENT DOCUMENTS

| | | | |
|---|---|---|---|
| 4,751,992 | 6/1988 | Maucher et al. | 192/201 X |
| 4,790,419 | 12/1988 | Loizeau | 74/574 X |
| 4,813,295 | 3/1989 | Drexl et al. | 74/574 X |
| 4,842,116 | 6/1989 | Fukushima | 192/214.1 |
| 4,844,224 | 7/1989 | Fukushima . | |
| 4,844,225 | 7/1989 | Fukushima . | |
| 4,846,323 | 7/1989 | Fukushima | 192/70.17 X |
| 4,928,486 | 5/1990 | Despres | 192/214.1 X |
| 5,070,979 | 12/1991 | Ohtsuka et al. . | |

FOREIGN PATENT DOCUMENTS

| | | |
|---|---|---|
| 3624755 | 1/1988 | Germany . |
| 3706849 | 9/1988 | Germany . |
| 3823384 | 1/1990 | Germany . |
| 3941251 | 6/1990 | Germany . |
| 4128868 | 3/1993 | Germany . |
| 4414033 | 4/1994 | Germany . |
| 4337613 | 5/1995 | Germany . |
| 2150653 | 7/1985 | United Kingdom . |
| 2171172 | 8/1986 | United Kingdom . |

Primary Examiner—Rodney H. Bonck
Attorney, Agent, or Firm—Nils H. Ljungman and Associates

[57] ABSTRACT

A divided flywheel apparatus has a first centrifugal mass connected to a driving mechanism, a second centrifugal mass engaged with the first centrifugal mass my means of a torsional vibration damper, whereby the second centrifugal mass is capable of a limited relative rotation with respect to the first centrifugal mass, and a damping device which contains at least one vibration damper, by means of which, under specified operating conditions, a frictional connection can be established between the two centrifugal masses. The damping device has a sensor apparatus, by means of which the occurrence of at least one measurement corresponding to a specified operating condition can be measured, and by means of a signal transmitted to a switching apparatus, the actuation of the vibration damper can be triggered by means of an actuation device which can be actuated by means of the switching device, resulting in an effective action which is a function of the value measured.

20 Claims, 6 Drawing Sheets

TRANSMISSION OF AN INTERNAL COMBUSTION ENGINE WITH A CLUTCH WITH A TWO-MASS FLYWHEEL

BACKGROUND OF THE INVENTION

1. Field of the Invention

This invention relates to clutches with a divided flywheel apparatus having a first centrifugal mass connected to a driving mechanism and a second centrifugal mass engaged with the first centrifugal mass by means of a torsional vibration damper. The second centrifugal mass is capable of a limited relative rotation with respect to the first centrifugal mass, and the apparatus further includes a damping device which contains at least one vibration damper, by means of which, under specified operating conditions, a frictional connection can be established between the two centrifugal masses.

2. Background Information

Such a flywheel apparatus for a clutch mechanism is, for example, known through German Patent No. 39 41 251 A1. Between a first centrifugal mass and a second centrifugal mass which can rotate in relation to the first centrifugal mass, there is a torsional vibration damper which consists of a torsion spring system and a friction device. Axially between the two centrifugal masses there is also a vibration damper of a damping device which, at a pre-determined rotational speed, preferably at the speed of rotation corresponding to the resonance speed through which the system passes during startup and shutdown of the internal combustion engine, is actuated so that a predetermined moment can be transmitted from the first centrifugal mass to the second centrifugal mass. It thereby becomes possible, when the system passes through the resonance speed, to suppress extreme relative rotations of the two centrifugal masses relative to one another by means of the friction action of the vibration damper, and thereby to prevent springs of the torsion spring system interposed between the two centrifugal masses from being compressed all the way, which can result in damage to the system.

According to the above-referenced unexamined patent application, the friction moment between the centrifugal masses exerted by the vibration damper can be set at an arbitrarily high value, whereby the setting can be achieved on one hand by selecting an axial spring which applies a pressure to the vibration damper, and on the other hand by means of the disengagement force exerted on the clutch housing of the friction clutch. As soon as the axial spring for the vibration damper is installed in the friction clutch, there are essentially no further possibilities for adjusting the vibration damper, since the release force which is applied to an application means, such as by a membrane spring for release of the clutch, is defined as a function of this membrane spring, and consequently essentially always acts with a constant strength on the clutch housing of the friction clutch for the axial displacement of the friction clutch toward the axial spring.

The flywheel apparatus disclosed in the above-referenced unexamined patent application is a so-called "dry" model, requiring no lubricant, such as grease, etc. In contrast, German Patent No. 41 28 868 A1, which corresponds to U.S. Pat. No. 5,307,710, discloses a divided flywheel apparatus in which a torsional vibration damper between the two circumferential masses, which vibration damper acts in the circumferential direction, is located inside a sealed chamber which is filled with viscous medium. The viscous medium can be used to achieve a damping of a relative rotation of the two centrifugal masses with respect to one another, wherein the damping is proportional to velocity. As a result of this arrangement, a torsion spring system can be installed in the circumferential area with extremely long-stroke springs. With such a torsion spring system, the resonance frequency of the flywheel apparatus can be set close to the starting speed of a driving mechanism, such as that of an internal combustion engine, so that when the system passes through the resonance frequency, e.g. during the starting procedure, the energy supplied by the driving mechanism is too low to cause any damage to the flywheel apparatus. As soon as this very low resonance frequency has been passed through during the starting procedure, the frequency does not recur during further operation of the driving system, since the frequency is significantly below the idle speed. A flywheel apparatus with a chamber for viscous medium therefore does not necessarily require an additionally active vibration damper between the two centrifugal masses. However, on account of the presence of the chamber, the flywheel apparatus is significantly larger than the above-mentioned "dry" model, and since means are necessary to seal the chamber, it is also significantly more expensive to provide such an arrangement in which a viscous medium needs to be sealed.

To damp torsional vibrations, one design solution is known in which a friction clutch is combined with a device which positions a clutch engagement or release mechanism by means of the actuating drive of an automatic clutch. Such a device is illustrated and described, for example, in German Patent No. 36 24 755 A1. The actuating drive is regulated so that torsional vibrations, which can cause noises for example, are damped by a predetermined slip between the friction linings of the clutch plate and the corresponding clutch elements.

One disadvantage of such a mode of operation of the friction clutch is that the operating ranges in which slip is used to damp vibrations are relatively large. Since these ranges also include operating ranges where high torque loads are experienced, the result is a high degree of wear on the linings and the generation of a large amount of heat from this mode of operation.

OBJECT OF THE INVENTION

The object of the present invention is therefore to design a flywheel apparatus so that the flywheel apparatus takes up a small amount of space, is economical in terms of manufacture and energy consumption, and can be operated at the resonance speed without the risk of damage to the vibration damper of a damping device.

SUMMARY OF THE INVENTION

The present invention teaches that this object can be achieved by means of a two-mass flywheel wherein the damping device has a sensor apparatus, by means of which sensor apparatus the occurrence of at least one measurement corresponding to a specified operating condition can be measured, and, by means of a signal transmitted to a switching apparatus, the actuation of the vibration damper can be triggered by means of an actuation device which can be adjusted by means of the switching device, resulting in an effective action which is a function of the value measured.

In an alternative embodiment, this object can be achieved with a two-mass flywheel which has a damping device which has at least one vibration damper, by means of which vibration damper, in a predetermined position of a clutch engagement or release mechanism, a frictional connection can be established between the two centrifugal masses, wherein the clutch engagement and release mechanism can be moved in at least one direction of its travel beyond the distance required for the engagement or disengagement, to cause the actuation of the vibration damper within the additional distance thereby travelled.

On account of the configuration of the flywheel apparatus with the vibration damper, a grease chamber filled at least partly with viscous medium can essentially be eliminated, whereby the vibration damper, as a function of its actuation threshold, if desired, can also be operated so that a damping, proportional to the speed, can be achieved. This damping can be comparable to the damping achieved by viscous medium in a grease chamber. In addition, since the resonance speed may be comparatively high on account of the additional damping device, a torsion spring system with very low spring rigidity can essentially be eliminated. Consequently, since such a torsion spring system, on account of its significant length in the circumferential direction, can be conventionally located in the radially circumferential area of the centrifugal masses, it becomes possible to realize a significantly more compact flywheel apparatus. Such a more compact flywheel apparatus is essentially possible since, when the vibration damper can preferably be used, the circumferential areas of the centrifugal masses remain free for other components of the flywheel apparatus, e.g. for the friction linings of the friction clutch. The use of the vibration damper consequently makes possible a compact and economical construction of a divided flywheel apparatus.

The damping device has a sensor apparatus, by means of which, when a measurement is taken which corresponds to at least one pre-determined operating condition, the operating condition can be detected. Then, after a signal is sent to a switching device, the vibration damper can be actuated by means of an actuation device actuated by the switching device, with an action which can preferably be a function of the value of the measurement. It can thereby essentially be guaranteed that the friction exerted by the damping device between the two centrifugal masses will be just great enough so that torsional vibrations introduced by the driving mechanism on the one hand can effectively be damped, and thus the amplitudes of the resonance frequencies can be reduced. However, on the other hand, so that excessive damping can be prevented, which would cause the damping device to have an unnecessarily high energy consumption, and since the two centrifugal masses would be coupled to one another non-positively with more force than necessary, at least a portion of the damping characteristics, which can typically inherently be excellent on a divided flywheel apparatus, would be useless, or wasted in terms of eliminating torsional vibrations.

The above-mentioned excellent damping characteristics of a divided flywheel apparatus can be based on the relative rotation of the two centrifugal masses with respect to one another, with the deformation of springs of the interposed torsional vibration damper. When the system passes through a resonance frequency, there can be a risk that the two centrifugal masses may be increasingly displaced in opposite directions, and ultimately can only be stopped when the above-mentioned springs of the torsional vibration damper are compressed to the limit or, in the case where friction shoes are located between the springs, when these shoes come into contact with one another. The passage through a resonance range can be consequently advantageously determined, when the sensor apparatus determines, by monitoring the relative velocity of the centrifugal masses, whether the latter exceed a specified relative acceleration with respect to one another. Then, if so, the sensor apparatus emits a signal to a switching apparatus, by means of which switching apparatus the vibration damper can be adjusted by means of an actuation device. The adjustment can be done preferably with precisely the amount of force necessary to return the relative acceleration of the two centrifugal masses to an allowable relative acceleration. It has thereby been found to be advantageous if the sensor apparatus, can be capable of determining the rotational velocities of the two centrifugal masses by monitoring markings on the masses, and emitting a corresponding signal.

The same can preferably be true for a further embodiment in which the corresponding signal can be sent as a function of the rotational speed of the drive mechanism, or of the flywheel apparatus, or as a function of the position of a component which has an influence on the application means of the friction clutch, such as: the clutch pedal; the actuating drive of an automatic clutch; or of a clutch engagement and release mechanism. For the correct evaluation of the different signals, the switching apparatus can be designed to contain a switching element which either calculates a reference input variable, or command variable, which corresponds to the signal, or reads the related reference input variable from a memory in which the corresponding reference input variables can be stored for a number of signals. The switching element can then use the value calculated or read to adjust the actuation device.

As mentioned briefly above, alternatively to the determination of the relative velocity of the two centrifugal masses with respect to one another, a sensor apparatus can also be used to detect the speed of rotation of the driving mechanism or of the flywheel apparatus, since the ranges of rotational speed at which resonance can occur are generally known. The speed range between the starting speed when the engine can be started and the idle speed has been found to be particularly critical, whereby, immediately above the starting speed, torsional vibrations can be introduced from the drive side, which torsional vibrations can be dangerous for the flywheel apparatus, even though the energy content of these torsional vibrations can generally not be sufficient to destroy the flywheel apparatus. Essentially only as the speed continues to increase, but still remains significantly below the idle speed, do the torsional vibrations achieve an energy content which, on account of resonance, can lead to the destruction of the flywheel apparatus. On the basis of this knowledge, the vibration damper can of course be actuated as early as during the starting procedure, but initially only with a moderate action, while, when the system passes through the known most dangerous frequency, it can preferably be advantageous to fully activate the vibration damper.

The embodiment of the flywheel apparatus with a sensor apparatus for the actuation of the actuation device as a function of the operating conditions of the friction clutch can operate as follows. The sensor apparatus determines the degree of deformation of the application means directly or indirectly, by measuring the position of a component which has an influence on the deformation of the application means. If, for example, the clutch pedal can preferably be depressed by an additional amount, or as a result of a corresponding actuation of the actuating drives of the automatic clutch, then the additional distance described above can be travelled beyond the "normal" travel for engagement or release. This additional travel can then preferably be detected by the sensor apparatus, and if the actuation device for the vibration damper can essentially be actuated by the clutch pedal or the actuating drive of the automatic clutch, after a signal has been emitted by the sensor apparatus, the switching device can then be actuated to actuate a direct drive corresponding to one of the actuation devices for the vibration damper.

Such an actuation device which can be controlled on the basis of the signal emitted by the sensor apparatus via a switching apparatus, can, as indicated above, be a direct drive which applies pressure directly to the vibration damper of the damping device, but can also be the actuating drive of an automatic clutch system. Then, by means of this actuating drive, the vibration damper can be adjusted by means of the clutch release mechanism and the application means of the friction clutch on which the clutch release acts. The above-mentioned application means can be a membrane disc, for example, which, when pressure is applied by means of a clutch engagement mechanism, transmits the application force necessary for the clutch engagement process. But the application means can also be formed by a membrane spring which, on account of its natural prestress, or bias, supplies the application force, and can be deformed by a clutch release mechanism so that there can be a reduction in the pressure applied to an application plate of the friction clutch.

In the event that the actuation device can be realized in the form of the actuating drive of an automatic clutch system, operation can preferably be advantageous, since the friction clutch can be engaged or released beyond the "normal" actuator travel of the clutch engagement or release mechanism. In addition, the vibration damper can be activated over an additional distance adjacent to this travel, over which additional distance the clutch engagement and release mechanism can be moved under the action of the actuating drive if, for example, the application means travel an additional distance beyond the normal engagement or release. Depending on whether the additional travel of the clutch engagement or release mechanism is on the engagement side or on the release side of the proper actuator travel, the vibration damper can preferably be actuated before or after the engagement or disengagement process.

In a flywheel apparatus in which the vibration damper of the damping device can preferably be actuated by means of a clutch release mechanism, in contrast to the embodiment discussed above, no sensor apparatus can be necessary to measure at least one value of an operating condition which poses a threat to the flywheel apparatus. In such a flywheel apparatus, the actuator travel of the actuation device and thus of the clutch engagement or release mechanism, and, of the application means, with respect to the actuator travel required for the engagement and disengagement mechanism, can preferably be simply increased by the additional travel described above. Thereby, the application means of the friction clutch can ultimately be used to actuate the vibration damper. The result can possibly be a particularly simple damping device, by means of which torsional vibrations can be effectively suppressed when the system passes through a resonance frequency. As a result of the location of the additional travel on the side of the actuator travel necessary for the engagement or release, the vibration damper can be actuated before an engagement of the friction clutch. In contrast, by extending the additional travel on the other end of the engagement or release travel, the vibration damper can essentially be actuated only after the clutch has assumed the engaged status.

If the additional travel of the actuation device, the clutch engagement or release mechanism, or the application means lies outside the actuator travel necessary for the engagement or release process, the vibration damper need not necessarily be activated for each engagement or release. Rather, the vibration damper need only be activated one time, to activate the actuation element in the case of an actuating drive of an automatic clutch system, i.e. only when the driving system is being started or shut down. In a similar manner, the clutch engagement or release mechanism can be operated by a conventional clutch pedal, if the pedal has an additional travel through which it passes once, and only when the engine is being started or shut down by the driver, in response to a corresponding operation of the clutch pedal.

In an advantageous embodiment of the vibration damper, the vibration damper is formed by at least one damper element that projects beyond the centrifugal mass and can be brought into contact with the respective other centrifugal mass, by means of the actuator device after displacement in essentially the axial direction.

In further embodiments of the invention, the application means are designed with at least one projection which penetrates a corresponding recess in the clutch housing, whereby the projection can be brought into non-positive contact with an element of the first centrifugal mass by a corresponding deformation of the application means, when the clutch engagement or release mechanism is within its additional travel distance.

Also, the contact element of the first centrifugal mass can be formed by a cover, preferably made in one piece, which cover can be non-rotationally applied in the axial direction to the circumferential area of the other centrifugal mass.

This cover can preferably be guided radially inward adjacent to the application means, and with its side facing the application means, can act as a stop, or contact surface for the latter.

In a still further embodiment, the two centrifugal masses can be moved relative to one another in the axial direction, whereby in the engaged position of the application means, a predetermined distance can be maintained between at least one vibration damper which is fastened to a centrifugal mass and a fixed stop part located on the other centrifugal mass, while in the disengaged position of the application means, the vibration damper can be brought into contact with a stop surface of the stop part by means of an axial spring which acts between the centrifugal masses.

The vibration damper can also preferably be provided with a pawl which reaches around and behind the radial stop surface on the stop part, and the axial spring can preferably be located in the axial direction between a counterpressure plate of the clutch housing and a cover plate, the cover plate being connected to a bearing which holds the two centrifugal masses coaxially in relation to one another. In addition, the cover plate, together with an additional cover plate, can locate the spring elements of the torsional spring system.

In a further aspect of the invention, it can preferably be particularly advantageous, in the embodiment in which the vibration damper can be activated by means of the application means, if the application means are held by a wear compensation mechanism in a constant position with respect to a clutch housing of the friction clutch, on one hand, and by the second centrifugal mass which supports this clutch housing on the other hand. Such a wear compensation mechanism is disclosed, for example, by German Patent Application 43 37 613.

In addition to the activation of the vibration damper between the centrifugal masses, it can also be possible to control or regulate the actuating drive of an automatic clutch system within the actuator travel available for engagement or release. Thus, the respective application means, e.g. a membrane spring in the clutch housing, or a clutch engagement mechanism which acts on a membrane disc mounted in the clutch housing, can be adjusted so that the friction linings of the clutch plate can be operated with a predetermined slip on their friction surfaces with the corresponding elements of the friction clutch. Thereby, on account of the friction, the torsional vibrations initiated by the driving mechanism can be damped, and the connection between the clutch plate and the elements of the friction clutch can thereby act as a second damping device. This so-called damping device can preferably be activated in the speed range above the resonance speed of the flywheel apparatus.

If the torsional vibrations introduced are so large that they can no longer be damped, even with maximum slip between the friction linings of the clutch plate and the corresponding elements of the friction clutch, the actuating drive must be actuated so that by releasing the application plate from the clutch plate, the transmission of torque can then essentially be interrupted. This interruption can preferably be for a specified period of time, after which time period a repeated clutch engagement can preferably be possible essentially without the danger of destroying the friction linings on the clutch plate.

It should be understood that when the word "invention" is used in this application, the word "invention" includes "inventions", that is, the plural of "invention". By stating "invention", Applicants do not in any way admit that the present application does not include more than one patentably and non-obviously distinct invention, and maintains the possibility that this application may include more than one patentably and non-obviously distinct invention. The Applicants hereby assert that the disclosure of this application may include more than one invention, and, in the event that there is more than one invention, that these inventions may be patentable and non-obvious, one with respect to the other.

One aspect of the invention resides broadly in a divided flywheel apparatus having a first centrifugal mass connected to a driving mechanism and a second centrifugal mass engaged with the first centrifugal mass by means of a torsional vibration damper, whereby the second centrifugal mass is capable of a limited relative rotation with respect to the first centrifugal mass, and a damping device which contains at least one vibration damper, by means of which, under specified operating conditions, a frictional connection can be established between the two centrifugal masses, wherein that the damping device has a sensor apparatus, by means of which the occurrence of at least one measurement corresponding to a specified operating condition can be measured, and, by means of a signal transmitted to a switching apparatus, the actuation of the vibration damper can be triggered by means of an actuation device which can be adjusted by means of the switching device, resulting in an effective action which is a function of the value measured.

Another aspect of the invention resides broadly in a divided flywheel apparatus, having a first centrifugal mass connected to a driving mechanism and a second centrifugal mass engaged with the first centrifugal mass by means of a torsional vibration damper, whereby the second centrifugal mass is capable of a limited relative rotation with respect to the first centrifugal mass, and a damping device which contains at least one vibration damper, by means of which, in a predetermined position of a clutch engagement or release mechanism, a frictional connection can be established between the two centrifugal masses, wherein the clutch engagement and release mechanism can be moved in at least one direction of its travel beyond the distance required for the engagement or disengagement, to cause the actuation of the vibration damper within the additional distance thereby travelled.

BRIEF DESCRIPTION OF THE DRAWINGS

The present invention is explained in greater detail below with reference to the embodiments illustrated in the accompanying drawings, in which.

DESCRIPTION OF THE PREFERRED EMBODIMENTS

Figure 1:
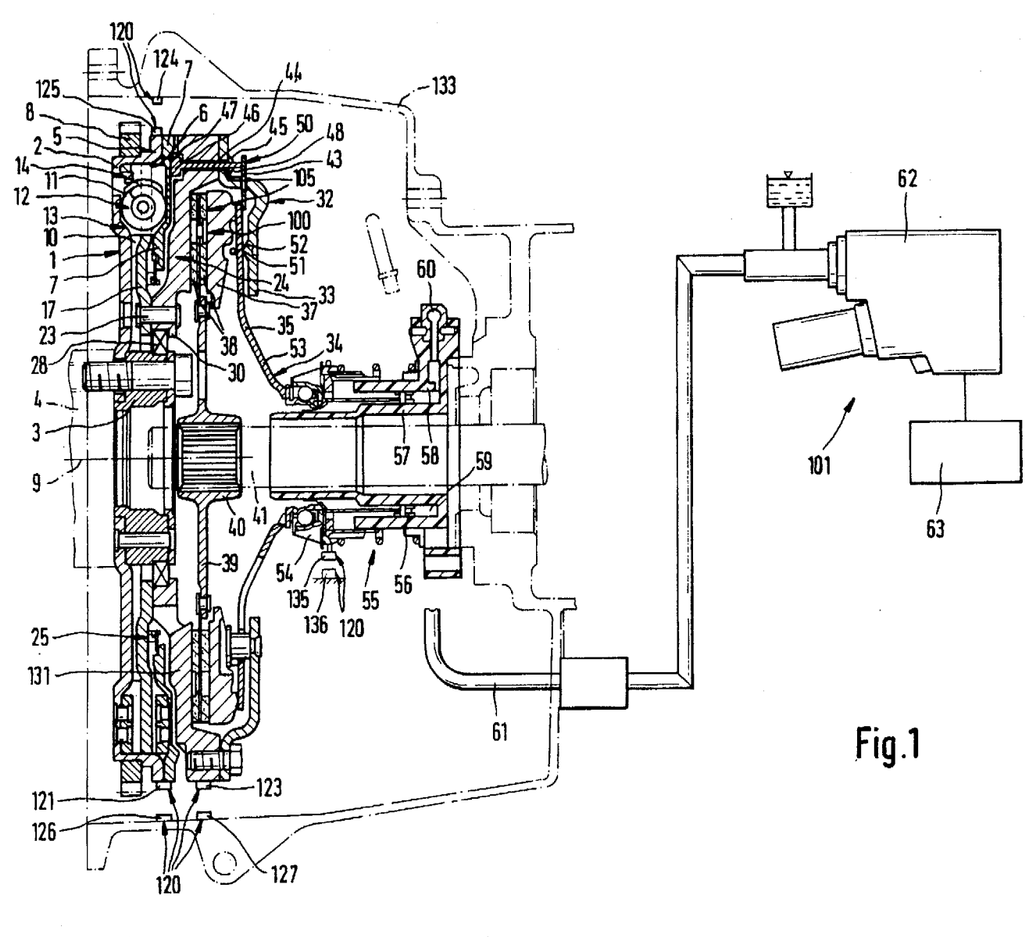
FIG. 1 shows a flywheel apparatus with an actuating drive of an actuator device which acts on a clutch release mechanism and a damping device which has a tappet as the vibration damper.

The flywheel apparatus illustrated in FIG. 1 includes a first centrifugal mass 1, which can preferably be composed of a primary disc 2. The primary disc 2 can be connected to a hub 3, whereby the hub 3 can be detachably fastened to the crankshaft 4 of a driving mechanism (not shown), e.g. an internal combustion engine. The primary disc 2 can be provided in the vicinity of its outside diameter with a ring 5 which can have an essentially cylindrical inner wall 6. Essentially parallel to the primary disc 2 and at some axial distance from the disc 2, there can preferably be a cover plate 7. The cover plate 7 can preferably be connected in the vicinity of its outside diameter to the ring 5. On the first centrifugal mass 1, a starter gear rim 8 can preferably be designed in one piece with the centrifugal mass 1, and engages with a starter motor (not shown). Alternatively, as is known in the art, the starter gear rim 8 could be a separate component that is fixedly attached to the centrifugal mass 1. All the parts which are connected to the hub 3 can preferably rotate together with the crankshaft 4 of the internal combustion engine around an axis of rotation 9.

The inside wall 6 of the ring 5 and the radially outer areas of the primary disc 2 on the cover plate 7 can form a chamber 10. This chamber 10 can preferably be disposed concentric to the axis of rotation 9. In this chamber 10, there can be spring elements 11 of a torsion spring system 12, which together with a known friction device, which is therefore not illustrated, form a torsional vibration damper 13. The actuation of the spring elements 11 results from the first centrifugal mass 1 by means of segments (not shown) which can be fastened to the inner sides of the primary disc 2 and the cover plate 7. The segments can act on the spring element 11 to preferably be in contact with the interposition of a flexible helical spring 14. In this embodiment, the chamber 10 can preferably be filled at least partly with a viscous medium. Although the spring elements 11 on the present flywheel can be relatively rigid, the chamber 10 need not absolutely be filled with the viscous medium.

The torques absorbed by the torsion spring system 12 can be transmitted to a hub disc 17, which hub disc 17 can preferably be active as a moment carrier 25 for a second centrifugal mass 24. This second centrifugal mass 24 can preferably be connected to the hub disc 17 by means of rivets 23. The second centrifugal mass 24, radially inside the connection area, can be placed on a bearing 28, preferably a roller bearing, which bearing 28 can preferably be firmly attached to the hub 3 in the axial direction. The second centrifugal mass 24 can be axially secured on one hand by means of a flange 30, and on the other hand by the radially inner area of the hub disc 17. The second centrifugal mass 24 can also be used to locate a friction clutch 32. The friction clutch 32 can have a clutch housing 33 fastened to the second centrifugal mass 24.

In the clutch housing 33 a membrane spring 35 acting as an application means 34 can be inserted. This membrane spring 35, by means of its radially outer area, applies pressure with one side to an application plate 37, which application plate has a common friction surface with a friction lining 38 of a clutch plate 39. The clutch plate 39 can preferably be equipped with friction linings 38 on both sides. The other friction lining 38 of the clutch plate 39 can have a common friction surface with a corresponding area of the second centrifugal mass 24. The clutch plate 39 has a hub 40, by means of which hub 40 the clutch plate 39 can preferably be non-rotationally fastened to a transmission-side output shaft 41.

The radially outer area of the membrane spring 35, with its side away from the application plate 37, can be brought into contact with one end of a lever 43. This lever 43 can preferably be mounted so that it pivots in the middle thereof on the clutch housing 33. This lever 43 can be engaged on the other end with the adjacent end of a tappet 44, which tappet 44 can penetrate the clutch housing 33 and the second centrifugal mass 24 by means of a shaft 45. The tappet 44 can preferably include an extension 46 running essentially perpendicular to the shaft 45 in a cavity 47, which cavity 47 can be located between the first centrifugal mass 1 and the second centrifugal mass 24. The tappet 44 can preferably be held in its rest position illustrated in FIG. 2 by a retaining element 48, whereby the retaining element 48 can preferably be formed by a spring which can be engaged in notches formed on the shaft 45. The tappet 44, together with the lever 43, forms a first vibration damper 50 of a damping device 105.

Radially inside the vibration damper 50, the membrane spring 35 can preferably be fixed on one side by a lug 51 of the clutch housing 33, and on the other side by a retaining ring 52. The membrane spring 35 can also have tabs 53, which tabs 53 extend radially inwardly. The tabs 53 of the membrane spring 35 can preferably be engaged on a clutch release bearing 54 of a clutch release 55. The clutch release 55 can be oriented concentric to the output shaft 41, and can have a piston 56 which acts on the clutch release bearing 54, and can be guided in a sealed manner between an inner cylindrical wall 57 and an outer cylindrical wall 58. A cylindrical space 59, defined between the two walls 57 and 58, can be connected to a pressure medium connection 60, which pressure medium connection can preferably be connected by means of a line 61 to an actuating drive 62, e.g. like the one disclosed in German Patent No. 37 06 849 A1, which corresponds to U.S. Pat. No. 4,852,419.

Figure 6:
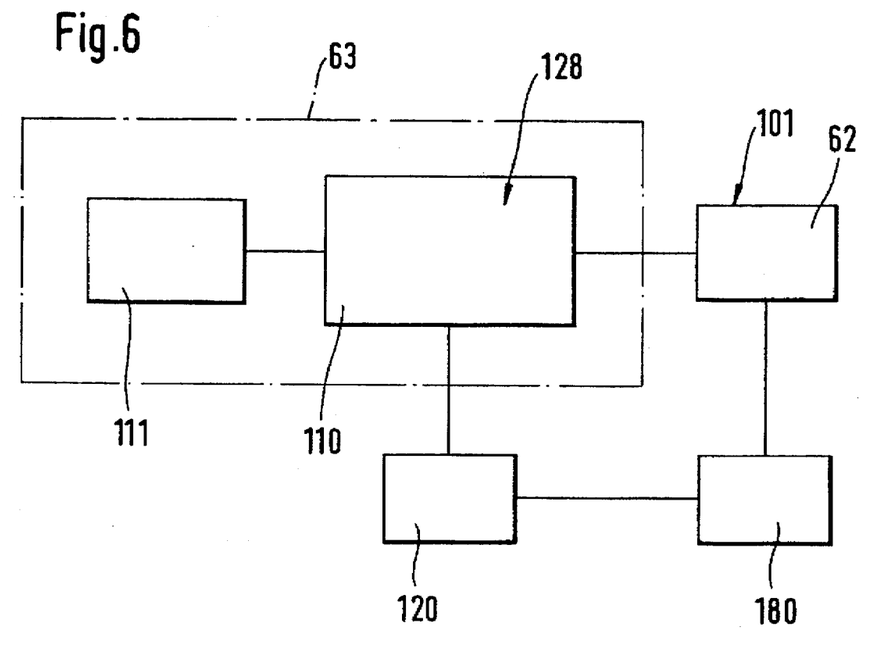
FIG. 6 shows a switching device in the form of a closed-loop control system.

Such an actuating drive 62 can preferably be part of an actuation device 101 which can be connected to a switching apparatus 63, which switching apparatus 63 can act as an open-loop or closed-loop control system. The switching apparatus 63, as illustrated in FIG. 6, can be designed as a closed-loop regulation system, and in addition to a controller 110, which controller 110 can act as a switching element 128, has a memory 111 connected to the controller 110. This controller 110 can preferably comprise a microprocessor unit for processing electronic signals. Some examples of control units are provided further herebelow.

The controller 110 can preferably be connected to the actuating drive 62 and to a sensor apparatus 120, which sensor apparatus 120 is explained in greater detail below. By means of the sensor apparatus 120, the current operating condition of the flywheel apparatus can be transmitted to the controller 110. There can also be an additional connection by means of a controlled system 180, by which the current measurements can be transmitted to the controller 110 for any adjustments which may be necessary.

For a clearer understanding of this switching apparatus 63, the sensor apparatus 120 will be described in detail first. As shown in FIG. 1, this sensor apparatus 120 can be formed, for example, by a first marking 121 which can preferably be located so that the marking 121 rotates in the circumferential direction in the circumferential area on the first centrifugal mass 1. Interacting with this marking 121, there can preferably be a first speed impulse receiver 126 which monitors the marking 121. This speed impulse receiver 126 can be fastened to a gearbox casing 133 indicated in dashed lines in FIG. 1. The sensor apparatus 120 also has a second marking 123, which second marking 123 can be provided on the second centrifugal mass 24. This second marking 123 preferably rotates in the circumferential area in the circumferential direction. Interacting with this second marking 123, there can preferably be a second speed impulse receiver 127 to monitor the marking 123. The latter receiver 127 can also be fastened to the gearbox casing 133, and specifically, like the first receiver 126, can be located on the inside of the gearbox casing 133 opposite the corresponding marking 121 or 123, respectively. Viewed in the circumferential direction, the markings can have light/dark zones for optical monitoring, or can be configured as Hall effect sensors for electromagnetic monitoring. It would also be conceivable to use the gear teeth of the starter rim 8 as the first marking 121. Some additional examples of optical, magnetic and Hall effect sensors are set forth further herebelow.

When torsional vibrations are initiated in the flywheel apparatus, the two centrifugal masses 1 and 24 execute a movement relative to one another, which movement, in essence, could be described as rotation of one disc with respect to the other. This movement can then be detected by means of the rotational speed receivers 126, 127 on the basis of the different rotational velocities measured, and can essentially be represented in the form of a relative velocity. On the basis of the known physical relationship of velocity and acceleration, when the relative velocity and a measurement interval are known, it can be possible to determine the relative acceleration of the centrifugal masses in relation to one another, e.g. by means of the microprocessor unit of the switching apparatus 63. The determination of the relative acceleration of the two masses with respect to one another can be of major importance, since when the relative acceleration is too high, damage can occur to the flywheel apparatus.

The system can preferably function as follows. If, when the system passes through a resonance frequency, torsional vibrations are transmitted to the first centrifugal mass 1, which torsional vibrations cause an increase in the relative acceleration of the two centrifugal masses 1, 24 with respect to one another, this increase can continue until an excessive relative acceleration of the centrifugal masses 1, 24 can be determined by means of the rotational speed sensors 126, 127. A generated signal can then be sent to the sensor apparatus 120. As a result of the generated signal, clutch release mechanism 55 can be displaced far enough by the switching apparatus 63 and the actuating drive 62, so that the vibration damper 50 can be activated and, depending on the settings, the relative acceleration between the two centrifugal masses 1,24 can be either reduced or eliminated altogether.

In the case of a damping action by the vibration damper 50, as soon as the relative acceleration between the two centrifugal masses 1, 24 has been reduced to a specified, allowable value, the vibration damper 50 can preferably once again be deactivated. The deactivation can be determined as a function of the speed of rotation of the centrifugal masses 1, 24. For determining the speed of rotation, there can be a speed impulse transmitter 125 on the radially outside portion of the first centrifugal mass 1, and opposite the transmitter 125, radially inside on the gearbox casing 133, illustrated in dashed lines in FIG. 1, there can be a speed impulse receiver 124. The speed impulse receiver 124 can preferably be connected to the switching apparatus 63. At least one speed of rotation, at which a resonance frequency can essentially no longer be expected, can be stored in the above-referenced memory 111 as a value for the setting of the switching apparatus 63.

When the relative acceleration of the centrifugal masses 1, 24 can be determined by the sensor apparatus 120, signals can be sent to the loop controller 110, whereby each signal corresponds to a specified relative acceleration. The loop controller 110 calls up the reference input variable corresponding to the value measured for this relative acceleration from the memory 111, and transmits the reference variable to the actuation device 101. The actuation device 101 then operates the actuating drive 62, and by means of the operating actuating drive 62, the vibration damper 50 can be activated with a friction force between the centrifugal masses 1, 24 corresponding to the relative acceleration between the centrifugal masses 1, 24. It should also be noted that the reference input variables input into the memory 111 can be determined as the result of measurement operations and can then be stored in the memory. Such measurement operations could essentially be done at the manufacturing facility for a series of operating conditions corresponding to various different types of automobiles, and could then be pre-installed at the factory prior to shipping the assembly to the automobile manufacturer for installation in a drive train.

If the markings 121, 123 and the speed impulse receivers 126, 127 are omitted, the evaluation of the values transmitted by the speed impulse receivers 124 can also be sufficient, if these values are fed into the loop controller 110. In this case, both the speed impulse transmitter 125 and the speed impulse receiver 124 can be part of the sensor apparatus 120. The latter, when it records a speed as a measurement value, sends a signal corresponding to the measurement to the loop controller 110. The loop controller 110 then calls up from the memory 111 a reference input variable which corresponds to this signal. Then, as a function of this reference input variable, the loop controller 110 controls the actuation device 101 and thus the actuator drive 62 so that in frequency ranges in which a resonance frequency is expected, the vibration damper 50 can essentially be automatically activated. In the other frequency ranges when it is essentially known that the resonance frequencies will not be damaging, the vibration damper can essentially remain out of operation.

Depending on the instructions received as a result of the reference input variables, the loop controller 110 can thereby control the drive actuator 62 so that within a range of the resonance frequency, the vibration damper 50 can be regulated to correspond to the current speed.

Figure 7:
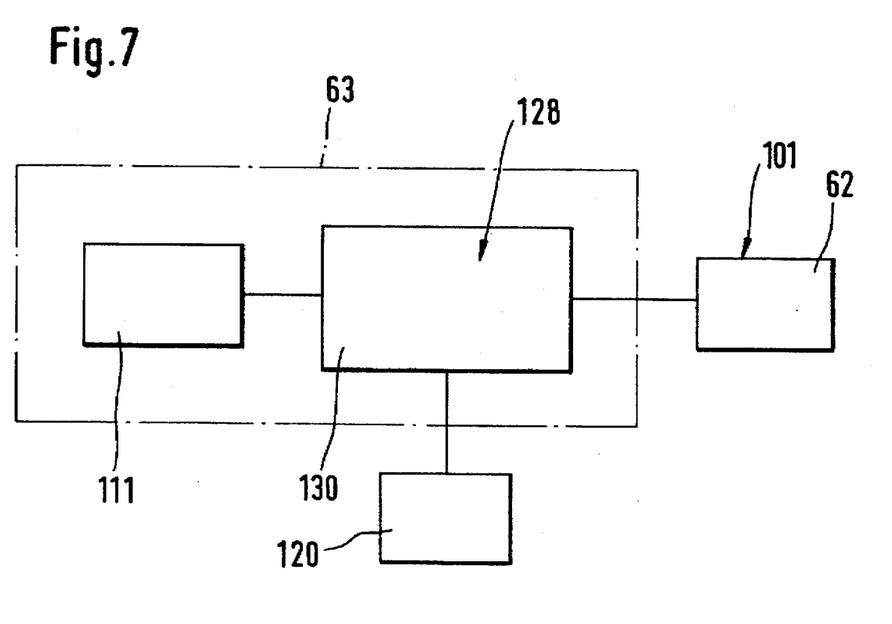
FIG. 7 shows a switching device, but designed as an open-loop control system.

If the switching apparatus is formed by an open-loop control device as shown in FIG. 7, the loop controller 110 can be replaced by an open-loop control 130 as the switching element 128. The function of the open-loop control 130 can essentially be the same as the loop controller 110, but with the difference that, on account of the absence of the directly controlled system 180, there will essentially be no feedback from the sensor apparatus 120 by means of which the vibration damper 50 could be readjusted. The open-loop control 130, when it receives a signal from the sensor apparatus 120, can essentially only call up a reference input variable corresponding to this signal from the memory 111, and thereby control the actuator device 101 as a function of this reference input variable, so that the vibration damper 50 can be operated with an action which corresponds to the reference input variable.

Figure 2:
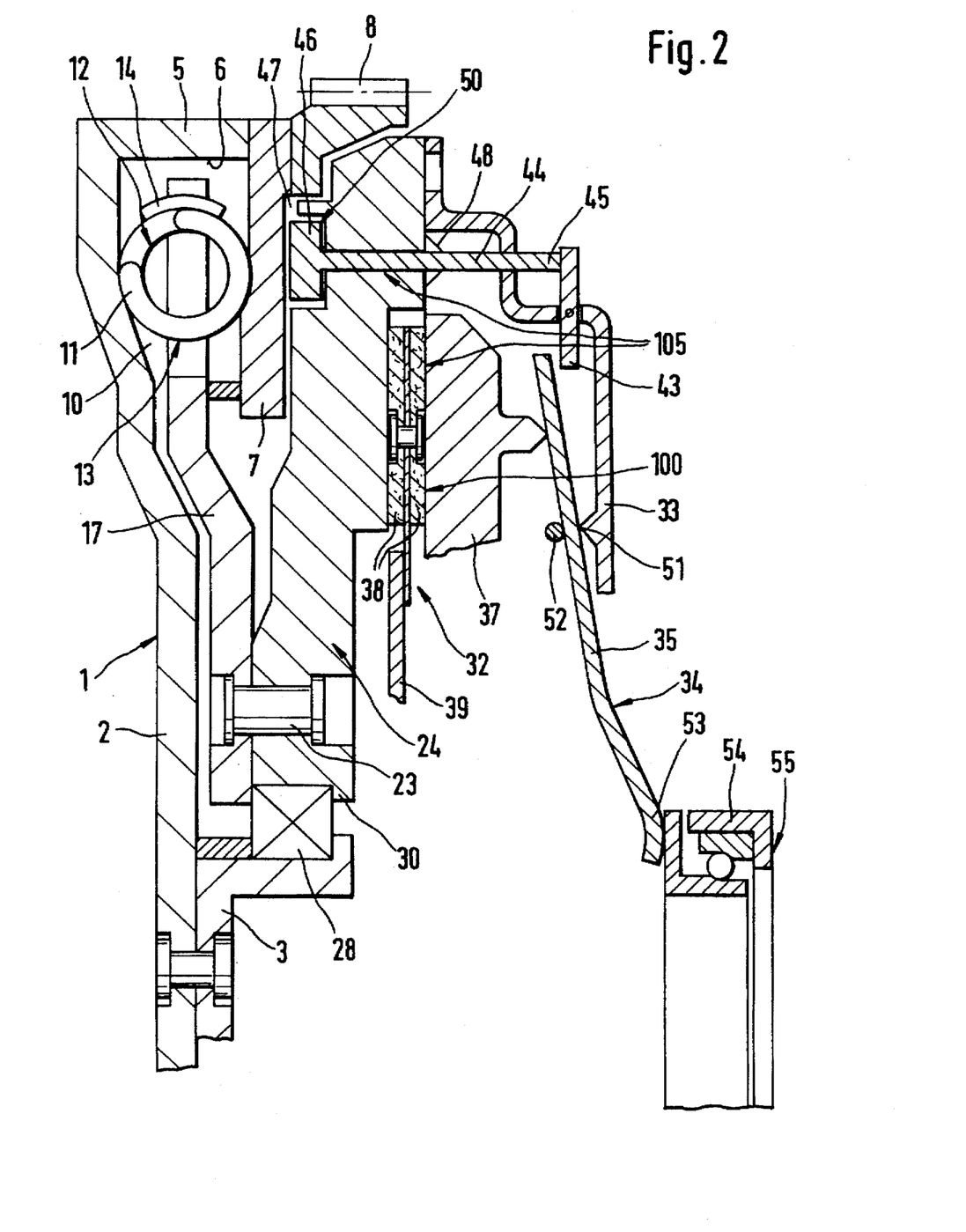
FIG. 2 shows a detail of the damping device on a larger scale.

As a function of the instructions received from the switching apparatus 63, the actuating drive 62 of the actuator device 101 can be actuated, preferably at speeds in the range between the starting speed and the idle speed, so that hydraulic fluid in the line 61 can be displaced into the cylinder chamber 59 of the hydraulic clutch release mechanism 55. Thus, the piston 56 of the clutch release mechanism 55 can preferably be forced out toward the flywheel apparatus, whereby the clutch release bearing 54 pushes the tabs 53 of the membrane spring to the left, as shown in FIGS. 1 and 2. The membrane spring 35 can thereby be pivoted around its pivot points, these pivot points being formed on the clutch housing 33 by the lug 51 and the retaining ring 52. As a result, on one hand, there can be a reduction of the application force applied to the application plate 37, and on the other hand, there can be a displacement of the lever 43 around its axis of rotation on the clutch housing 33, whereby the lever 43 displaces the tappet 44 of the vibration damper 50 against the action of the retaining element 48 toward the first centrifugal mass 1, until the extension 46 of the tappet 44 comes into contact against the first centrifugal mass 1. As a function of the actuator travel of the piston 56 of the clutch release mechanism 55, and thus of the displacement of the membrane spring 35, the tappet 44 can be pressed more or less strongly against the centrifugal mass 1, and can generate friction on the latter, which can result in a reduction of the oscillation width of the centrifugal masses 1 and 24 with respect to one another, or even to a complete interlocking of the centrifugal masses 1 and 24 with one another. Likewise, the oscillation width of the membrane spring 35 determines the extent to which the application plate 37 will be relieved of the application force previously exerted on it. The oscillation width of the membrane spring 35 can thereby be selected so that there can be some slip between the friction linings 38 of the clutch plate 39 and the corresponding friction surface on the second centrifugal mass 24 and on the application plate 37, so that the connection between the clutch plate 39 and the clutch elements 24, 37 can be active as a second damping device 100 (see FIG. 2). Torsional vibrations which cannot be reduced by a conventional friction device can be damped both by the friction which can be generated between the friction linings 38 of the clutch plate 39 and the above-mentioned clutch elements 24, 37, and also by the friction which is generated by the tappet 44 on the centrifugal mass 1, which can be the case in particular when the system passes through a resonance frequency.

As soon as the sensor apparatus 120, after the decrease of the torsional vibrations to an allowable value, actuates the actuating drive 62 by means of the switching apparatus 63 for the opposite direction of action, hydraulic fluid can exit the cylinder chamber 59 of the clutch release 55 via the pressure medium connection 60 and flow into the line 61. The piston 56 can thereby be pushed back by the tabs 53 of the membrane spring 35, via the clutch release bearing 55 into its starting position, and when the force of the membrane spring 35 is removed from the lever 43, the tappet 44 can be pushed back into its original position under the action of the return element 48. Simultaneously, as a result of the return movement of the membrane spring 35, increasing pressure can once again be applied to the application plate 37, until, as soon as the membrane spring has assumed its starting position, it can again be pressed with the full application force against the friction linings 38, and, via these friction linings 38, against the second centrifugal mass 24.

In place of the membrane spring 35, which membrane spring 35 is described above as the application means, it can also be possible to use a membrane disc, which itself would not be able to apply the surface pressure required between the application plate 37 and the friction linings 38 of the clutch plate 39 on the one hand, and between the latter and the second centrifugal mass 24 acting as the counterpressure plate 131 on the other hand. When a membrane disc is used as the application means 34, instead of the clutch release 55 mechanism, a clutch engagement mechanism, which has a corresponding design and is therefore not illustrated in detail, can be used, in which essentially only the supply of the pressure medium is reversed, so that, for the engagement of the membrane disc in FIG. 1, the engagement mechanism can be moved to the left, and to release the clutch, the engagement mechanism can be moved to the right. The natural prestress, or bias of the membrane disc is just sufficient to keep the tabs 53 in contact with the clutch engagement mechanism, when the latter moves toward the right. Such a membrane disc is disclosed, for example, in German Patent Application 44 14 033.

It is understandable that, when a membrane spring 35 is used as the application means 34 in combination with a clutch release 55, the vibration damper 50 can be activated during the clutch release or disengagement, and when a membrane disc is used as the application means 34 in connection with an engagement mechanism, the damper 50 can be activated during clutch engagement. As a function of the design of the lever ratios on the application means 34, the vibration damper 50 can also be activated during the engagement or release process, but it can likewise be activated before or after this process. In the latter case, the clutch engagement or release mechanism 55 must be designed so that, in addition to its own actuator travel, it can travel an additional distance, within which the application means activates the vibration damper 50 before or after an engagement or release of the clutch. Depending on which side of the actuator travel this additional travel is located, the vibration damper 50 can essentially be activated before or after a clutching procedure, in connection with the design of the clutch engagement or release mechanism 55 and the design of the application means as a membrane spring 35 or as a membrane disc.

If the actuator device 101 has a clutch pedal instead of an actuating drive 62, it can then be possible to use the initial pedal travel for the engagement or release process, by moving the clutch release 55 within its actuator travel and by increasing the pedal travel by an additional distance, to bring the clutch engagement or release mechanism 55 into the additional travel in which the vibration damper 50 is activated. Depending on whether this additional pedal travel is toward the driver's foot or in the opposite direction, the vibration damper 50 can be activated before or after the engagement.

Figure 3:
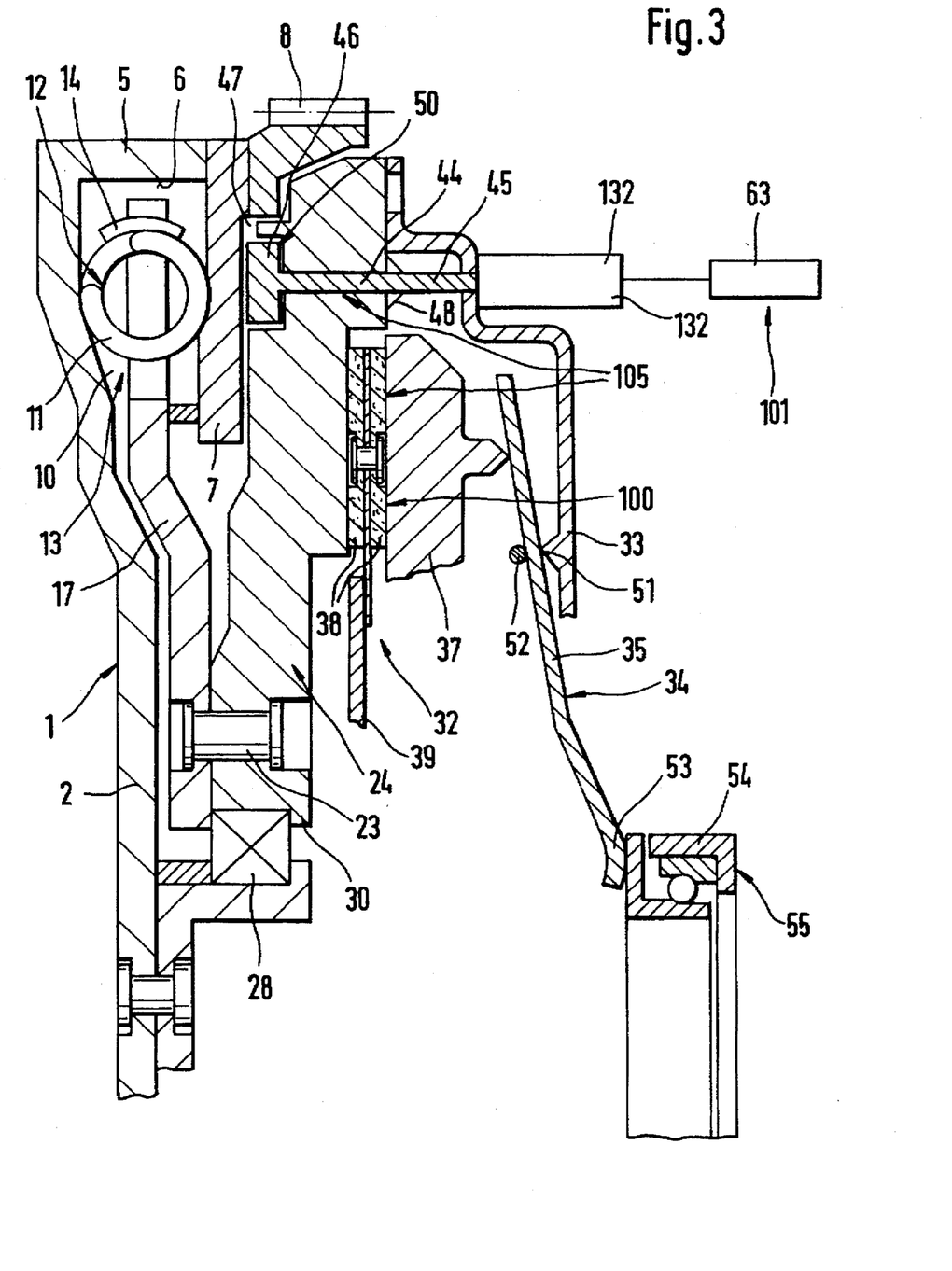
FIG. 3 shows a detail as in FIG. 2, but with a direct driving mechanism as the actuation device on the housing of a friction clutch.

In contrast to the arrangement illustrated in FIGS. 1 and 2, the actuator device 101, as shown in FIG. 3, can also have a direct drive mechanism 132 fastened to the clutch housing 33. The clutch housing 33 can act directly on the shaft 45 of the tappet 44 of the vibration damper 50. The lever 43 shown in FIGS. 1 and 2 can then preferably be omitted. For such a case, it can be advantageous, when an actuator device 101 with a clutch pedal is used, if, corresponding to the clutch engagement or release mechanism 55, there can be a position transmitter 135, which position transmitter 135, as shown in FIG. 1, can be located radially outwardly on the clutch engagement or release mechanism 55 and interacts with a position receiver 136. This position receiver 136 can be fastened radially inwardly on the gearbox casing 133. The position transmitter 135, together with the position receiver 136, can be a part of the sensor apparatus 120, and, when the clutch pedal is pressed, indicates when the normal clutch distance for engagement or release has been exceeded, and the clutch pedal is now moving a distance which places the clutch release mechanism 55 in its additional travel. As soon as the sensor apparatus 120, by means of the position receiver 136, detects the presence of the clutch engagement or release mechanism 55 in the additional travel, the direct drive mechanism 132 can be activated to activate the vibration damper 50. When the clutch pedal is moved back into its normal clutch travel, the signal from the sensor 120 ceases, so that the direct drive mechanism 132 can be deactivated, and the vibration damper can thereby be pulled back into its original position. The direct drive mechanism 132 also functions with the switching apparatus 63, and instead of being formed by a sensor apparatus 120 having a position transmitter 135 and a position receiver 136, can be formed by a similar sensor apparatus which has the speed transmitter 125 and speed receiver 124 or a sensor 122 for the determination of the oscillation of the centrifugal masses 1, 24.

On account of the actuation of the vibration damper 50 by means of the clutch engagement or release mechanism 55 and the application means 34, to guarantee a uniform position of the application means 34 inside the clutch housing 33 and with respect to the second centrifugal mass 24, which can preferably be independent of the degree of wear of the friction linings 38 between the application plate 37 and the clutch plate 39 on the one hand, and between the clutch plate 39 and the counterpressure plate 131 on the other hand, it can be advantageous to provide the friction clutch 32 with a wear compensation mechanism. Such wear compensation mechanisms, in themselves, are known, for which reason no further details will be provided here. Reference is made to German Patent Application 43 37 613, for example, which describes such a wear compensation mechanism. As a result of the inclusion of a wear compensation mechanism in the friction clutch 32 of the flywheel apparatus, it can also essentially be guaranteed that by means of the application means 34, and independent of the wear of the friction linings 38, the clutch can essentially always be engaged and released with a constant force, so that when a direct drive 132 or an actuating drive 62 are used for the actuation device 101, the drives can be optimally tuned to this force and can accordingly be designed so that they can be compact, while when a clutch pedal is used as the actuator device 101, the force which must be applied to the pedal can be small.

Figure 4:
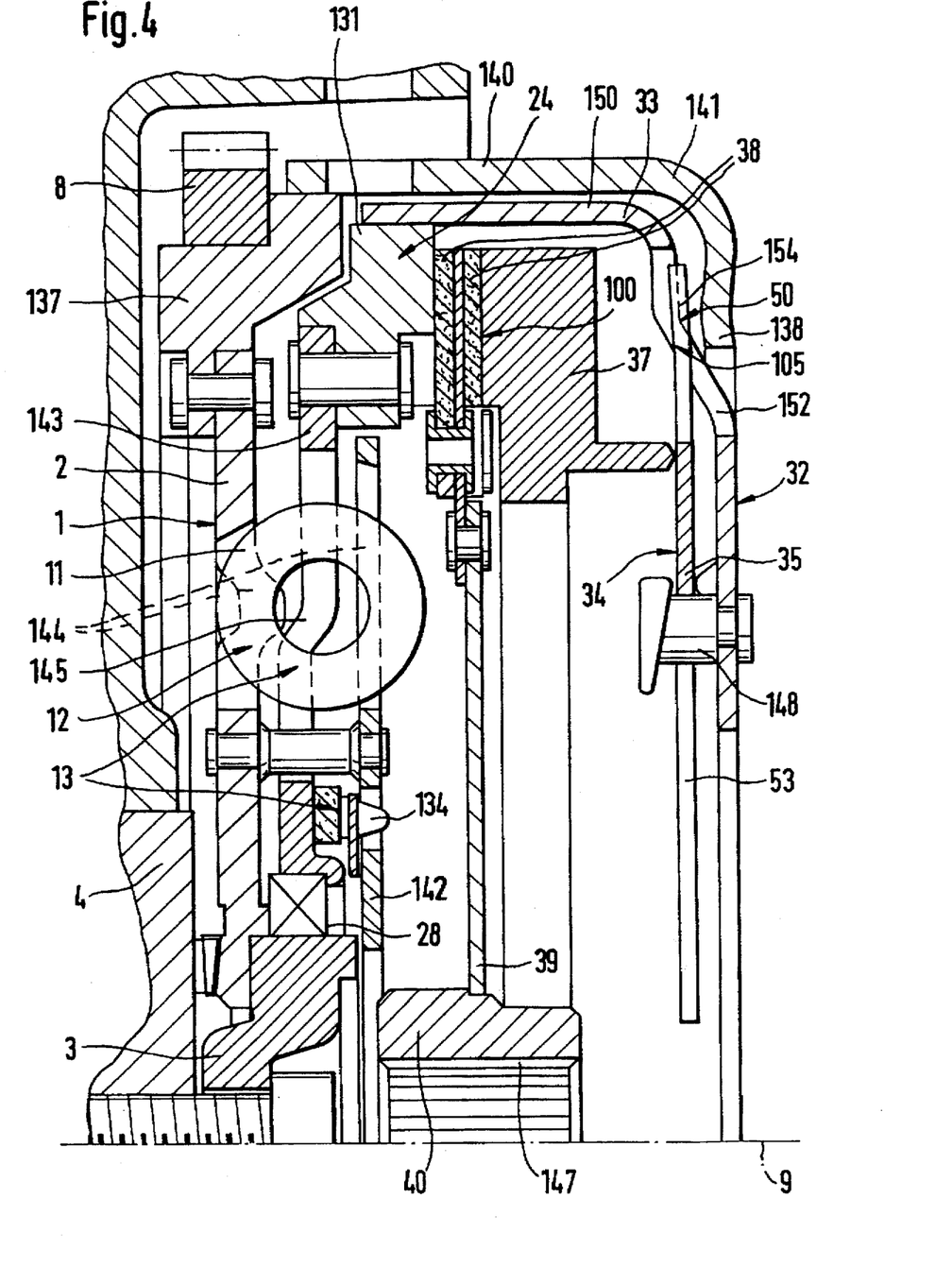
FIG. 4 shows a detail as in FIG. 2, but with a damping device which has the application means of the friction clutch as the vibration damper.

FIG. 4 shows an additional flywheel apparatus which differs from the apparatus described above essentially in terms of the design of the vibration damper 50. The clutch release 55, the actuator device 101 and the switching apparatus 63, on the other hand, can essentially be the same as those on the flywheel apparatus illustrated in FIG. 1, for which reason they are not shown in FIG. 4, and are therefore not mentioned in the corresponding part of the description.

A primary disc 2, by means of a hub 3, can be fastened to the crankshaft 4 of a driving mechanism (not shown). In the radially outer area, the primary disc 2 has a centrifugal mass ring 137, the circumferential portion of which contains a starter gear wheel 8, and in the radially outer region shown in FIG. 4, on the right, non-rotationally holds an element 140 in the form of a cover 141 with an end 138 which extends radially inward. The primary disc 2 also has, in addition to a similar cover plate 142, an aperture 144 which can be aligned with a corresponding aperture 145 of a hub disc 143, which hub disc 143 can be rotationally mounted by means of a ball bearing 28 on the hub 3 of the first centrifugal mass 1, and non-rotationally holds a counter pressure plate 131 in the radially outer area. The counter pressure plate 131 can be in active contact with a friction lining 38 of a clutch plate 39, while the other friction lining 38 of the clutch plate 39 can be in contact against an application plate 37. The clutch plate 39 itself can be fastened non-rotationally by means of gear teeth 147 on a transmission shaft (not shown). The flywheel apparatus, between the hub disc 143 and the cover plate 142, has a friction device 134 of the conventional type, which together with a torsion spring system 12 can be part of a torsional vibration damper 13.

The required non-positive, or frictional connection between the application plate 37, the friction linings 38 and the counter pressure plate 131 can be generated by a membrane spring 35 which acts as the application means 34, and which can be mounted in a known manner by means of pivots 148 on the clutch housing 33. The clutch housing 33 can non-rotationally enclose the counter pressure plate 131 by means of an extension 150, which extension 150 preferably extends axially in relation to the first centrifugal mass 1. The clutch housing 33, in its radial portion, has recesses 152, through which radial, finger-like projections 154 of the membrane spring 35 extend. The recesses 152 can preferably be matched to the curvature of the projections 154. When, to release the clutch, radially inwardly engaged flexible tabs 53 of the membrane spring 35 are displaced to the left in FIG. 4, the membrane spring 35 can be pivoted around the pivots 148, thereby relieving the pressure on the application plate 37. When the flexible tabs 53 have been displaced even farther to the left, as the clutch release has executed its normal travel and can be moved into its additional travel, the projections 154 come into contact against the end 138 of the cover 141. Since the cover 141 can be non-rotationally connected to the first centrifugal mass 1, and the clutch housing 33 supporting the membrane spring 35 can be non-rotationally connected to the second centrifugal mass (which second centrifugal mass supports the application plate 37, the clutch plate 39 and the counter pressure plate 131, as well as the hub disc 143), there can be a non-positive, frictional connection between the projections 154 of the membrane spring 35 and the end 138 of the cover 141. The projections 154 of the membrane spring 35 are, therefore, like the cover 141, part of a vibration damper 50. To eliminate the above-mentioned frictional connection, it can be sufficient to return the clutch release mechanism 55 from its additional travel into the area of its normal travel.

Figure 5:
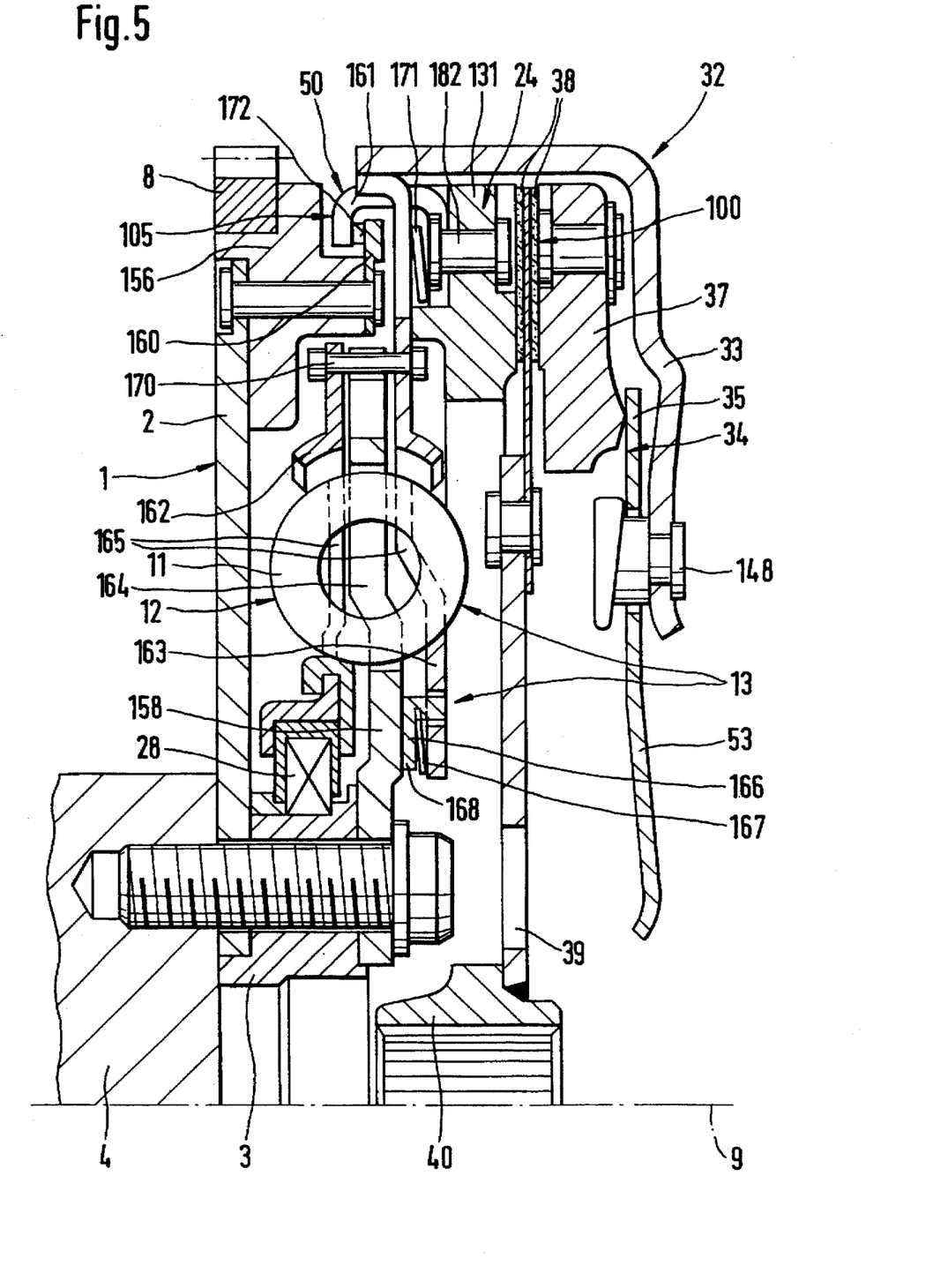
FIG. 5 shows a detail as in FIG. 2, but with a damping device which contains a pawl as the vibration damper.

As with the flywheel apparatus illustrated in FIG. 4, on the flywheel apparatus illustrated in FIG. 5, first the clutch can be released and then the vibration damper 50 can be activated. The flywheel apparatus, on the first flywheel 1, has a primary disc 2 which can be fastened by means of a hub 3 to the crankshaft 4 of a driving mechanism. This primary disc 2, in its radially outer area, supports the starter rim 8 as well as a ring 156, which has a contact or stop part 160 with a radial contact surface 172 for engagement with a pawl 161, which pawl 161 can be fastened to the second centrifugal mass 24 in a manner described below, and can act as part of the vibration damper 50.

In addition to the primary disc 2, the hub 3 and the ring 156, the first centrifugal mass 1 can also have a hub disc 158 which can be engaged between two cover plates 162 and 163, and which, like the hub disc 158, has apertures 164, 165 to hold spring elements 11 of a torsion spring system 12. The torsion spring system 12, viewed in the circumferential direction, can preferably be supported, on one end, on one side of the aperture 164, and, on the other end, on the respective other side of the aperture 165. The cover plates 162, 163 can be part of the second centrifugal mass 24, whereby the left cover plate 162 in FIG. 5 can be located on a roller bearing 28, which bearing 28 sits on the hub 3 of the first centrifugal mass 1. The cover plate 163 can hold a friction apparatus 166 between itself and the hub disc 158, which friction apparatus 166 can be composed of a spring plate 167 and a friction part 168. This friction device 166 is designed and functions in a known manner. The two cover plates 162 and 163 can be firmly connected to one another by means of rivets 170, whereby the cover plate 163 supports the clutch housing 33. A clutch plate 39 with friction linings 38 can be located between a counter pressure plate 131, which counter pressure plate 131 can be located in the clutch housing 33, and an application plate 37. The clutch plate 39, for its part, can be fastened to a hub 40 which can be non-rotationally fastened to a transmission shaft (not shown).

The application force between the application plate 37, the clutch plate 39 and the counter pressure plate 131 can be generated by the membrane spring 35 which acts as the application means 34. The membrane spring 35 can be mounted so that it can pivot on pivots 148 and can be released by means of a clutch release mechanism 55, not shown here, which can essentially be like the one illustrated in FIG. 1. For this purpose, the radially inner ends of the flexible tabs 53 of the membrane spring 35 can be displaced to the left as shown in FIG. 5, thereby relieving the pressure on the application plate 37. An axial spring 171, which has a pre-determined bias and can be located axially between the cover plate 163 of the centrifugal mass 24 and the counter pressure plate 131 of the friction clutch 32, can thereby be activated, whereby the axial spring 171 pushes the counter pressure plate 131, the clutch plate 39 and the application plate 37 toward the membrane spring 35. At least one pawl 161 can be fastened to the counter pressure plate 131 by means of rivets 182, and this pawl 161 acts as a vibration damper 50, and with its free end, reaches around behind the contact surface 172 on the contact part 160. This at least one pawl 161 can also be axially displaced, because it can be carried along with the counter pressure plate 131, and comes into a frictional contact on its above-mentioned free end with the contact surface 172 of the contact part 160. The vibration damper 50 can thereby be activated. Conversely, when the pressure on the flexible tabs 53 of the membrane spring 35 is essentially eliminated by a backward movement of the clutch release mechanism, pressure can be applied to the application plate 37, and thus the counter pressure plate 131, in the axial direction, so that the counter pressure plate 131, under the action of the increase of the bias of the energy storage device or spring 171 between the cover plate 163 and the counter pressure plate 131, can be pushed back into their initial position. When the friction clutch 32 is engaged, the vibration damper 50 can be lifted off and can thus be released from the contact surface 172 on the contact part 160.

It should be noted that similar components in the above-discussed embodiments of the present invention have been given the same reference numbers in essentially all of the figures.

Some examples of optical and other systems which might be used with or in the present invention are:

U.S. Pat. No. : 5,280,981, Inventor: Gordon R. Schulz, Title: End effector with load-sensitive digit actuation mechanisms; U.S. Pat. No. : 5,250,888, Inventor: Hang du Yu, Title: Apparatus for and process of rotating a display; U.S. Pat. No. : 5,191,284, Inventors: Roberto Moretti and Angelo Varvello, Title: Device for detecting the relative rotational speed of two elements in a vehicle wheel; U.S. Pat. No. : 5,239,263, Inventors: Hitoshi Iwata, Katsuhiro Minami, Hisahiro Ando, Hisashi Hirose and Shigeru Iguchi, Title: Magnetic rotation sensor for rotary shaft; U.S. Pat. No. : 5,252,919, Inventor: Saburo Uemura, Title: Apparatus producing trapezoidal waveforms from a pair of magnetic sensors for detecting the rotating angle of an object; U.S. Pat. No. : 5,291,319, Inventor: Ellis D. Harris, Title: Rotating disc optical synchronization system using binary diffractive optical elements; U.S. Pat. No. : 5,307,549, Inventors: Seisuke Tsutsumi and Nobuyuki Ito, Title: Apparatus and method for synchronized control of machine tools; U.S. Pat. No.: 5,309,094, Inventors: Christian Rigaux and Pascal Lhote, Title: Bearing rotary speed sensor with concentric multipole magnetic rings axially aligned with collector branches; U.S. Pat. No. : 5,192,877, Inventors: Jean Bittebierre and Philippe Biton, Title: Hall effect sensor and component providing differential detection; Inventors: Shigemi Murata and Masayuki Ikeuchi, Title: Angle detecting device having improved mounting arrangement for mounting Hall-effect sensor which has an angle detecting device including a magnetism gap where a magnetic-flux shutter rotates synchronously with a detection subject, a magnetic flux generator provided at one side of the gap, a magnetic-flux detector provided at the other side of the gap, an outlet of the signals from the detector, a frame integrally including the above-described generator, detector and outlet, and anchoring portions mechanically fixing the detector in a housing portion of the frame. In one embodiment, the anchoring portions are a pair of saw-toothed tabs formed by cutting and bending out a section of the plate. The saw-toothed tabs cut into the inner wall of the housing when the detector is inserted. In another embodiment, the anchoring portions are a pair of supporting tabs formed by bending extensions of the plate. The supporting tabs are clamped between a lower surface of the housing and a cover. In still another embodiment, a pair of coupling tabs provided with holes are formed integrally on the plate, and a pair of projections are integrally resin-molded in the housing portion of the frame. The projections passed through the holes are caulked when the detector is inserted.

Some examples of control devices and other systems which might be used with or in the present invention are:

U.S. Pat. No. : 4,852,419, Inventors: Friedrich Kittel, Dieter Lutz, Franz Nagler, Horst Oppitz and Gerhard Gasper, Title: Control device, in particular for a motor-vehicle friction clutch; U.S. Pat. No. : 5,212,380, Inventors: Seiichi Sato, Kazuo Yamaguchi, Yoshi Kurosawa, Atsushi Ueda and Masami Matsumura, Title: Automotive engine control system with rotary encoder indexing; U.S. Pat. No. : 5,326,160, Inventors: John P. Bayliss and Sean Byrnes, Title: Hydraulic systems for vehicles; U.S. Pat. No. : 5,307,013, Inventors: Alfred J. Santos and Michael C. Brauer, Title: Digital position sensor system for detecting automatic transmission gear modes.

One feature of the invention resides broadly in the divided flywheel apparatus, having a first centrifugal mass connected to a driving mechanism and a second centrifugal mass engaged with the first centrifugal mass by means of a torsional vibration damper, whereby the second centrifugal mass is capable of a limited relative rotation with respect to the first centrifugal mass, and a damping device which contains at least one vibration damper, by means of which, under specified operating conditions, a frictional connection can be established between the two centrifugal masses, characterized by the fact that the damping device 105 has a sensor apparatus 120, by means of which the occurrence of at least one measurement corresponding to a specified operating condition can be measured, and, by means of a signal transmitted to a switching apparatus 63, the actuation of the vibration damper 50 can be triggered by means of an actuation device 101 which can be adjusted by means of the switching device 63, resulting in an effective action which is a function of the value measured.

Another feature of the invention resides broadly in the flywheel apparatus characterized by the fact that, by means of the sensor apparatus 120, a specified operating condition, such as excessive relative acceleration, velocity or movement, can be determined, and, by means of a corresponding signal which is transmitted to the switching apparatus 63, a value, which corresponds to the signal, can be determined for adjusting the actuation device 101.

Yet another feature of the invention resides broadly in the flywheel apparatus characterized by the fact that, by means of the sensor apparatus 120, the velocity of both centrifugal masses 1, 24 can be measured, in that respective speed sensors 126, 127 can be used to monitor corresponding markings 121, 123 which rotate preferably in the circumferential direction on the centrifugal masses 1, 24.

Still another feature of the invention resides broadly in the flywheel apparatus characterized by the fact that, by means of the sensor apparatus 120, when the centrifugal masses 1, 24 pass through a specified speed range, this passage can be detected as a measurement for the specified operating condition.

A further feature of the invention resides broadly in the flywheel apparatus characterized by the fact that, by means of the sensor apparatus 120, when passing through different critical speed ranges, by means of a corresponding signal transmission to the switching apparatus 63, a reference input variable can be determined which corresponds to the setting of the actuation device 101.

Another feature of the invention resides broadly in the flywheel apparatus characterized by the fact that, by means of the sensor apparatus 120, at least one preset position of a component clutch pedal, actuating drive 62, direct drive 132, clutch release 55 which influences the degree of deformation of the application means 34 of the friction clutch 32 can be defined, and, by means of a corresponding signal which is transmitted to the switching apparatus 63, a reference input variable, or command variable can be determined which corresponds to the setting of the actuation device 101.

Yet another feature of the invention resides broadly in the flywheel apparatus characterized by the fact that the switching apparatus 63 has a memory 111 for the values and a switching element 128 for the correspondence between the values and a signal from the sensor apparatus 120.

Still another feature of the invention resides broadly in the flywheel apparatus with application means which are part of a friction clutch which is supported by the second centrifugal mass, whereby the degree of deformation of the application means is a function of the current position of a clutch engagement or clutch release mechanism in the axial direction, characterized by the fact that, by means of the actuation device 101, which acts as a actuating drive 62 of an automatic clutch system, the clutch engagement or release mechanism 55 can be moved into a position in which, by means of the application means 34, it defines the setting of the vibration damper 50 of the damping device 105.

A further feature of the invention resides broadly in the flywheel apparatus characterized by the fact that the clutch engagement or release mechanism 55 can be moved in at least one direction of its travel beyond the distance required to engage or release the clutch, to cause the actuation of the vibration damper within an additional distance thereby travelled.

Another feature of the invention resides broadly in the flywheel apparatus characterized by the fact that, corresponding to the additional travel of the clutch engagement or release mechanism 55, there is a displacement distance of the application means 34.

Yet another feature of the invention resides broadly in the divided flywheel apparatus, having a first centrifugal mass connected to a driving mechanism and a second centrifugal mass engaged with the first centrifugal mass by means of a torsional vibration damper, whereby the second centrifugal mass is capable of a limited relative rotation with respect to the first centrifugal mass, and a damping device which contains at least one vibration damper, by means of which, in a predetermined position of a clutch engagement or release mechanism, a frictional connection can be established between the two centrifugal masses, characterized by the fact that the clutch engagement and release mechanism 55 can be moved in at least one direction of its travel beyond the distance required for the engagement or disengagement, to cause the actuation of the vibration damper 50 within the additional distance thereby travelled.

Still another feature of the invention resides broadly in the flywheel apparatus with an application means which is part of a friction clutch which is supported by the second centrifugal mass, and the deformation of which is a function of the current position of the clutch engagement or release mechanism in the axial direction, characterized by the fact that a defined deformation range of the application means 34 corresponds to the additional travel of the clutch engagement or release mechanism 55.

A further feature of the invention resides broadly in the flywheel apparatus characterized by the fact that the additional travel is adjacent to that end of the travel of the clutch engagement or release mechanism 55 reached by the latter when the friction clutch 32 is disengaged.

Another feature of the invention resides broadly in the flywheel apparatus characterized by the fact that the additional travel is adjacent to that end of the travel of the clutch engagement or release mechanism 55 reached by the latter when the friction clutch 32 is engaged.

Yet another feature of the invention resides broadly in the flywheel apparatus characterized by the fact that the clutch engagement or release mechanism 55 can be moved into its current position by the actuation element 101 which acts as an actuating drive 62 of an automatic clutch system.

Still another feature of the invention resides broadly in the flywheel apparatus characterized by the fact that the clutch engagement or release mechanism 55 can be moved into its current position by means of a clutch pedal.

A further feature of the invention resides broadly in the flywheel apparatus characterized by the fact that the vibration damper 50 is formed by at least one damper element tappet 44, application means 34, pawl 161 which projects beyond a centrifugal mass 24 and can be brought into contact with the respective other centrifugal mass 1, by means of the actuator device 101 after displacement in the essentially axial direction.

Another feature of the invention resides broadly in the flywheel apparatus characterized by the fact that the application means 34 are designed with at least one projection 154 which penetrates a corresponding recess 152 in the clutch housing 33, whereby the projection 154 can be brought into non-positive contact with an element 140 of the first centrifugal mass 1 by a corresponding deformation of the application means 34 when the clutch engagement or release mechanism is within its additional travel distance.

Yet another feature of the invention resides broadly in the flywheel apparatus characterized by the fact that this element 140 is formed by a cover 141, preferably made in one piece, which can be non-rotationally applied in the axial direction to the circumferential area of the other centrifugal mass 1.

Still another feature of the invention resides broadly in the flywheel apparatus characterized by the fact that the cover 141 is guided radially inward adjacent to the application means 34, and with its side facing the application means 34, acts as a stop, or contact surface for the latter.

A further feature of the invention resides broadly in the flywheel apparatus characterized by the fact that the two centrifugal masses 1, 24 can be moved relative to one another in the axial direction, whereby in the engaged position of the application means 34, a predetermined distance can be maintained between at least one vibration damper 50 which is fastened to a centrifugal mass 24 and a fixed stop part 160 located on the other centrifugal mass 1, while in the disengaged position of the application means 34, the vibration damper 50 can be brought into contact with a stop surface 172 of the stop part 160 by means of an axial spring 171 which acts between the centrifugal masses 1, 24.

Another feature of the invention resides broadly in the flywheel apparatus characterized by the fact that the vibration damper 50 has a pawl 161 which reaches around and behind the radial stop surface 172 on the stop part 160.

Yet another feature of the invention resides broadly in the flywheel apparatus characterized by the fact that the axial spring 171 is located in the axial direction between a counterpressure plate 131 of the clutch housing 33 and a cover plate 163, the cover plate being connected to a bearing 28 which holds the two centrifugal masses 1, 24 coaxially in relation to one another.

Still another feature of the invention resides broadly in the flywheel apparatus characterized by the fact that the cover plate 163, together with an additional cover plate 162, locates the spring elements 11 of the torsional spring system 12.

A further feature of the invention resides broadly in the flywheel apparatus characterized by the fact that the friction clutch 32 corresponding to the second centrifugal mass 24 has a wear compensation mechanism corresponding to the application means 34.

Another feature of the invention resides broadly in the flywheel apparatus characterized by the fact that the actuator device 101 interacts with the application means 34 so that when there are torsional vibrations, the application means 34 actuate a second damping device 100 by reducing the transmissible torque, preferably by lowering the application force exerted by the application means 34 on the clutch plate 39 via the application plate 37.

Yet another feature of the invention resides broadly in the flywheel apparatus characterized by the fact that when there is an increase in the torsional vibrations beyond a predetermined limit value, the actuator device 101 exerts pressure on the application means 34 by means of the clutch engagement or release mechanism 55, so that the latter causes the application plate 37 to be released from the clutch plate 39, for an at least temporary interruption of the transmission of torque.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application Nos., P 195 19 363.6 filed on May 26, 1995, and P 44 25 065.7, filed on Jul. 15, 1994, having inventors Michael Weiss, Jörg Sudau, Bernhard Schierling, Thomas Wirth, Jürgen Kleifges, Reinhard Feldhaus, Andreas Orlam under, and Eberhard Knaupp, and DE-OS P 195 19 363.6 and P 44 25 065.7 and DE-PS P 195 19 363.6 and P 44 25 065.7.

The invention as described hereinabove in the context of the preferred embodiments is not to be taken as limited to all of the provided details thereof, since modifications and variations thereof may be made without departing from the spirit and scope of the invention.

What is claimed is:

1. A clutch comprising:

means for engaging and disengaging said clutch;

said clutch engaging and disengaging means comprising means for moving through a first range of motion, said first range of motion being for engaging and disengaging said clutch;

a first centrifugal mass for being connected to a driving mechanism;

a second centrifugal mass;

means for engaging said first centrifugal mass with said second centrifugal mass;

said centrifugal mass engaging means comprising a torsional vibration damper to permit said second centrifugal mass to move rotationally with respect to said first centrifugal mass;

a damping device to dampen rotational movement between said second centrifugal mass and said first centrifugal mass;

said damping device comprising a frictional damping device to establish a frictional connection between said first centrifugal mass and said second centrifugal mass to frictionally engage said first centrifugal mass and second frictional mass with one another;

said clutch engaging and disengaging means comprising means for moving through a second range of motion, said second range of motion being for actuating said frictional damping device to make a frictional connection between said first and second centrifugal masses, said second range of motion being outside of said first range of motion, said first range of motion engages and disengages said clutch;

said means for moving through a first range of motion and said means for moving through a second range of motion together comprising application means;

said frictional damping device comprising a damping element configured to extend from said second centrifugal mass;

said clutch comprising a housing connected to said second centrifugal mass;

said housing comprising at least one recess;

said frictional damping device comprising an element connected to said first centrifugal mass;

said damping element comprising at least one projection extending from said application means through said at least one housing recess to frictionally contact said element connected to said first centrifugal mass, upon said application means being positioned within the second range of motion.

2. The clutch as claimed in claim 1, wherein:

said application means has a deformation range;

the deformation range has a first deformation range corresponding to said first range of motion, said first range of motion engaging and disengaging said clutch;

the deformation range has a second deformation range corresponding to said second range of motion, said second range of motion actuates said frictional connection means;

the first range of motion has a first end point for engaging said clutch and a second end point for disengaging said clutch;

the second range of motion is adjacent one of:
the first end point; and
the second end point;

said clutch has an axis of rotation;

said clutch has an axial direction substantially parallel to the axis of rotation;

said at least one projection extending from said application means is configured to move in the axial direction to frictionally contact said element connected to said first centrifugal mass, upon said application means being positioned within the second range of motion.

3. The clutch as claimed in claim 1, wherein:

said first centrifugal mass comprises a circumferential area; and said element connected to said first centrifugal mass comprises a cover connected to said circumferential area of said first centrifugal mass.

4. The clutch as claimed in claim 3, wherein:

said cover comprises an inside surface disposed towards said housing;

said cover comprises a portion extending substantially radially inward towards the axis of rotation; and said at least one projection is for contacting said inside surface of said cover, upon said application means being positioned within the second range of motion.

5. The clutch as claimed in claim 4, wherein:

said application means comprises a wear compensation mechanism; and said wear compensation mechanism comprises means for compensating for friction lining wear.

6. A clutch comprising:

means for engaging and disengaging said clutch;

said clutch engaging and disengaging means comprising means for moving through a first range of motion, said first range of motion being for engaging and disengaging said clutch;

a first centrifugal mass for being connected to a driving mechanism;

a second centrifugal mass;

means for engaging said first centrifugal mass with said second centrifugal mass;

said centrifugal mass engaging means comprising a torsional vibration damper to permit said second centrifugal mass to move rotationally with respect to said first centrifugal mass;

a damping device to dampen rotational movement between said second centrifugal mass and said first centrifugal mass;

said damping device comprising a frictional damping device to establish a frictional connection between said first centrifugal mass and said second centrifugal mass to frictionally engage said first centrifugal mass and second frictional mass with one another;

said clutch engaging and disengaging means comprising means for moving through a second range of motion, said second range of motion being for actuating said frictional damping device to make a frictional connection between said first and second centrifugal masses, said second range of motion being outside of said first range of motion, said first range of motion engages and disengages said clutch;

said means for moving through a first range of motion and said means for moving through a second range of motion together comprising application means;

said application means having a deformation range;

the deformation range having a first deformation range corresponding to said first range of motion, said first range of motion engaging and disengaging said clutch;

the deformation range having a second deformation range corresponding to said second range of motion, said second range of motion actuating said frictional damping device;

the first range of motion having a first end point for engaging said clutch and a second end point for disengaging said clutch;

the second range of motion being adjacent one of:
the first end point; and
the second end point;

said means for engaging and disengaging said clutch comprising means for being moved by one of:

an actuating drive of an automatic clutch system; and
a clutch pedal;

said clutch having an axis of rotation;

said clutch having an axial direction substantially parallel to the axis of rotation;

said frictional damping device comprising a damping element configured to extend from said second centrifugal mass;

said clutch comprising a housing connected to said second centrifugal mass;

said housing comprising at least one recess;

said frictional damping device comprising an element connected to said first centrifugal mass; and said damping element comprises at least one projection extending from said application means through said at least one housing recess to move in the axial direction to frictionally contact said element connected to said first centrifugal mass, upon said application means being positioned within the second range of motion.

7. The clutch as claimed in claim 6, wherein:

said first centrifugal mass comprises a circumferential area; and said element connected to said first centrifugal mass comprises a cover connected to said circumferential area of said first centrifugal mass.

8. The clutch as claimed in claim 7, wherein:

said cover comprises an inside surface disposed towards said housing;

said cover comprises a portion extending substantially radially inward towards the axis of rotation; and said at least one projection is for contacting said inside surface of said cover, upon said application means being positioned within the second range of motion.

9. The clutch as claimed in claim 8, wherein:

said application means comprises a wear compensation mechanism; and said wear compensation mechanism comprises means for compensating for friction lining wear.

10. The clutch as claimed in claim 9, wherein:

said means for engaging and disengaging said clutch comprises means for being moved by an actuating drive of an automatic clutch system;

said damping device comprises additional damping means; and said additional damping means comprises means for reducing torque transmitted by said clutch by reducing a force applied by said application means.

11. The clutch as claimed in claim 10, wherein:

said means for reducing torque transmitted comprise means for releasing said application means from a clutch plate to at least temporarily interrupt torque transmission.

12. A divided flywheel apparatus comprising:

a first centrifugal mass for being connected to a driving mechanism;

a second centrifugal mass;

means for engaging said first centrifugal mass with said second centrifugal mass;

said engaging means comprising a torsional vibration damper;

said torsional vibration damper comprising means for permitting said second centrifugal mass to move rotationally with respect to said first centrifugal mass; and a damping device comprising:
  at least one friction damper;
  said at least one friction damper comprising means for establishing a frictional connection between said first centrifugal mass and said second centrifugal mass to frictionally engage said first centrifugal mass and said second centrifugal mass with one another;
  sensor means;
  switching means;
  said sensor means comprising means for measuring an occurrence of at least one specified operating condition;
  said sensor means comprising means for transmitting a signal to said switching means;
  said switching means comprising means for adjusting actuation means in response to the signal of said sensor means; and
  the actuation means comprising means for actuating said frictional connection means to make a frictional connection between said first and second centrifugal masses.

13. The divided flywheel as claimed in claim 12, wherein:
said means for measuring an occurrence of at least one operating condition comprises means for measuring at least one of:
  excessive relative acceleration between said first centrifugal mass and said second centrifugal mass;
  excessive relative velocity between said first centrifugal mass and said second centrifugal mass; and
  excessive relative movement between said first centrifugal mass and said second centrifugal mass.

14. The divided flywheel as claimed in claim 13, wherein:
said first centrifugal mass comprises a circumferential area;
said second centrifugal mass comprises a circumferential area;
said means for measuring an occurrence of at least one operating condition comprises means for measuring a velocity of said first centrifugal mass and means for measuring a velocity of said second centrifugal mass;
said means for measuring a velocity of said first centrifugal mass comprises:
  a first marker disposed on said circumferential area of said first centrifugal mass; and
  a first speed sensor disposed to monitor said first marker; and
said means for measuring a velocity of said second centrifugal mass comprises:
  a second marker disposed on said circumferential area of said second centrifugal mass; and
  a second speed sensor disposed to monitor said second marker.

15. The divided flywheel as claimed in claim 12, wherein:
said means for measuring an occurrence of at least one operating condition comprises means for measuring at least one specified speed range of at least one of:
  said first centrifugal mass; and
  said second centrifugal mass.

16. The divided flywheel as claimed in claim 15, wherein:
said means for transmitting a signal comprises means for transmitting a signal corresponding to the at least one specified speed range; and
said switching means comprises means for comparing the signal of said transmitting means to at least one reference value and for controlling the means for adjusting the activation means.

17. The divided flywheel as claimed in claim 16, wherein:
said switching means comprises a memory for the reference values; and
said comparing and controlling means comprises a switching element.

18. The divided flywheel as claimed in claim 17, wherein:
the means for deforming the application means comprises means for engaging and disengaging the clutch;
the means for deforming the application means comprises the means for actuating said frictional connection means;
the actuation means comprises an actuation drive of an automatic clutch system; and
said second centrifugal mass comprises means for supporting the friction clutch.

19. The divided flywheel as claimed in claim 18, wherein:
the means for engaging and disengaging the clutch comprises means for moving through a first range of motion, said first range of motion for engaging and disengaging the clutch; and
the means for actuating the frictional connection means comprises means for moving through a second range of motion, said second range of motion is for actuating said frictional connection means to make a frictional connection between said first and second centrifugal masses, said second range of motion being outside of the first range of motion.

20. The divided flywheel as claimed in claim 12, wherein:
the actuation means comprises means for deforming an application means of a clutch, which deforming is in the axial direction;
said sensor means comprises means for sensing at least one position of at least one of the application means and the means for deforming the application means;
said means for transmitting a signal comprises means for transmitting a signal corresponding to the at least one position; and
said switching means comprises means for comparing the signal to at least one reference value and for controlling the means for adjusting the activation means.

* * * * *